United States Patent Office 3,440,255
Patented Apr. 22, 1969

3,440,255
PROCESS FOR PREPARING ORGANOTIN HALIDES
Sumio Matsuda, 5–17, Nishi-Ekimaecho, Ibaragi-shi, and Shoichi Kikkawa, 10, 1716 Midorigaoka Senriyama Suita-shi, Osaka, Japan
No Drawing. Continuation-in-part of application Ser. No. 413,635, Nov. 24, 1964. This application Sept. 28, 1967, Ser. No. 671,224
Int. Cl. C07f 7/22
U.S. Cl. 260—429.7         7 Claims

ABSTRACT OF THE DISCLOSURE

The organotin compounds of this invention are manufactured by reacting a halogenated organic compound with metallic tin in the presence of a catalyst.

CROSS REFERENCES TO RELATED APPLICATIONS

This application is a continuation-in-part of application Ser. No. 413,635 filed Nov. 24, 1964 and now abandoned.

SUMMARY OF THE INVENTION

This invention provides a process for the production of organotin compounds comprising reacting a halogenated organic compound with metallic tin in the presence of a catalyst at a temperature within the range of from about 0° C. to about 180° C., said halogenated organic compound being depicted by the formula

wherein:

X is a halogen,
R and R' are radicals selected from the group consisting of hydrogen and hydrocarbon radicals containing from 1 to 20 carbons which may be substituted with an alkoxy carbonyl radical containing from 2 to 10 carbon atoms, and
Y is a functional radical selected from the group consisting of (a) alkyl, alkenyl and alkynyl radicals each containing up to 20 carbon atoms which radicals individually may be substituted with alkoxycarbonyl, nitrilo, alkanoate, carboxy, hydroxy, carbonyl, alkoxyaryl, formyl, alkoxy, nitro, epoxy, arylketo, alkylamino, aryl and amino radicals, (b) aryl radicals each containing from 6 to 24 carbon atoms which radicals may be substituted with alkyl, alkenyl, alkynyl and carbamoyl radicals, (c) pyridyl radicals containing from 5 to 25 carbon atoms which radicals may be substituted with alkyl, alkenyl and alkynyl radicals, (d) nitrilo radicals, (e) oxacycloalkyl radicals containing from 2 to 10 carbon atoms, and (f) alkoxycarbonyl radicals containing from 2 to 20 carbon atoms, and said catalyst includes at least one material selected from the group consisting of metallic magnesium, iodine, alkyl halides containing from 1 to 20 carbon atoms, alcohols containing from 1 to 20 carbon atoms, and ethers containing from 2 to 20 carbon atoms.

DESCRIPTION OF THE PREFERRED EMBODIMENTS

The present invention is accomplished by reacting a halogenated organic compound with metallic tin in the presence of a catalyst. The catalyst utilized in this invention is a material selected from the group consisting of metallic magnesium, iodine, alkyl halides, alcohols and ethers.

The halogenated organic reactant of this invention is depicted by the following formula:

wherein:

X is a halogen,
R and R' are radicals selected from the group consisting of hydrogen and hydrocarbon radicals containing from 1 to 20 carbons which may be substituted with an alkoxy carbonyl radical containing from 2 to 10 carbon atoms, and
Y is a functional radical selected from the group consisting of (a) alkyl, alkenyl and alkynyl radicals each containing up to 20 carbon atoms which radicals individually may be substituted with alkoxycarbonyl, nitrilo, alkanoate, carboxy, hydroxy, carbonyl, alkoxyaryl, formyl, alkoxy, nitro, epoxy, arylketo, alkylamino, aryl and amino radicals, (b) aryl radicals each containing from 6 to 24 carbon atoms which radicals may be substituted with alkyl, alkenyl, alkynyl and carbamoyl radicals, (c) pyridyl radicals containing from 5 to 25 carbon atoms which radicals may be substituted with alkyl, alkenyl and alkynyl radicals, (d) nitrilo radicals, (e) oxacycloalkyl radicals containing from 2 to 10 carbon atoms, and (f) alkoxycarbonyl radicals containing from 2 to 20 carbon atoms, and said catalyst includes at least one material selected from the group consisting of metallic magnesium, iodine, alkyl halides containing from 1 to 20 carbon atoms, alcohols, containing from 1 to 20 carbon atoms, and ethers containing from 2 to 20 carbon atoms.

Specific preferred examples of the radical Y are as follows:

alkoxymethylene (—CH$_2$OR)
nitro (—NO$_2$)
dialkylaminomethyl (—CH$_2$NR$_2$)
vinylene (—CH—CH—R)
acyloxymethyl C—CH$_2$O—CR
acyl 

epoxyethylene 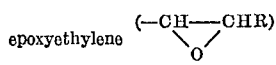
alkoxycarbonyl (—COOR)
N,N-dialklcarbamylmethylene (—CH$_2$CONR$_2$)
ethynylene (—C≡C—R)
cyano (—CN)

In the foregoing example of Y, R in all instances is an alkyl, alkenyl, alkynl, or aryl group containing up to about 20 carbon atoms and most preferably up to about 10 carbon atoms.

The process of this invention is conducted at a temperature within the range from 0° C. to about 180° C. and more preferably from 80° C. to 180° C. As a general rule, superatmospheric pressures are employed, however, ambient conditions may be utilized if desired. Preferably the pressure range is from about 1 atmosphere to about 100 atmospheres and more preferably from about 2 atmospheres to 30 atmospheres.

Although it is not essential, it is preferred that the reaction be conducted under an inert atmosphere. While many gases inert to the reaction system can be employed, nitrogen is most preferred due to its availability. Also an additional solvent may be utilized, the most preferable of which are benzene, toluene, xylene and hexane.

An important feature of this invention is the utilization of the catalyst or catalyst mixture. This catalyst may be composed of each of the following components either alone or in combination in the relative proportion specified. Metallic magnesium, iodine, or alkyl halide is employed in proportions ranging up to 5.0 mole percent excess above the moles of metallic tin employed and alcohols and ethers in proportions ranging up to about 10.0 mole percent excess above the moles of halogenated organic reagent employed. The alcohols and ethers contain from 1 to about 20 carbon atoms and preferably from 1 to about 5 carbon atoms. Tetrahydrofuran is an excellent catalyst adjuvant and hence is preferred.

The novel compounds produced according to this invention are depicted by the formula $$\begin{array}{c} R \quad X \quad R \\ | \quad | \quad | \\ Y-C-Sn-C-Y \\ | \quad | \quad | \\ R' \quad X \quad R' \end{array}$$

wherein R, R', X and Y are as defined hereinabove. These organotin compounds find utility as thermal stabilizers for thermoplastic resins such as polyvinyl chloride which are subject to oxidative deterioration. Also the compounds possess fungicidal activity and are useful for biocidal application.

In order that those skilled in th eart may better understand the present invention the following examples are given by way of description and not by way of limitation.

Example I

A reaction vessel was charged with 85 grams of 3-bromopropionic acid methyl ester (BrCH$_2$CH$_2$COOCH$_3$), 0.2 gram of metallic magnesium, 1 gram of butyl iodine, 5 cm.$^3$ of butyl alcohol and 20 grams of metallic tin leaf. The reaction was conducted at 160° C. for a period of three hours. During the course of the reaction all of the metallic tin was consumed. An 80 percent yield of bis(2-carboxyethyl)tin dibromide dimethyl ester

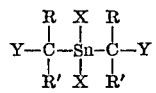

was recovered.

Example I is repeated in all detail except that 5 cc. of tetrahydrofuran are employed in lieu of the butyl alcohol. The above example is also repeated in all detail except that 3-chloropropionic acid methyl ester (ClCH$_2$CH$_2$COOCH$_3$)

is employed in lieu of the 3-bromopropionic acid methyl ester (BrCH$_2$CH$_2$COOCH$_3$) employed above. Excellent results are achieved in all above-described instances.

Example II

A reaction vessel was charged with 70 grams of 2-bromopropionitrile (BrCH$_2$CH$_2$CN), 0.1 gram of metallic magnesium, 1 gram of butyl iodide, 70 cm.$^3$ of tetrahydrofuran and 20 grams of metallic tin powder. The reaction was conducted at about 140° C. for three hours under a nitrogen atmosphere. All the metallic tin is consumed and a 90 percent yield of bis(2-cyanoethyl)tin dibromide

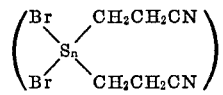

was recovered.

Example II is repeated in all details except that 2-iodopropionitrile (ICH$_2$CH$_2$CN) is used instead of 2-bromopropionitrile (BrCH$_2$CH$_2$CN). This reaction proceeds at about 100° C. and the yield is substantially quantitative. Example II is also repeated utilizing 2-chloropropionitrile (ClCH$_2$CH$_2$CN) instead of 2-bromopropionitrile (BrCH$_2$CH$_2$CN)

and about 50 percent of the desired product is realized. The temperature is about 160° C.

Example III

When 90 grams of 2-bromoethyl acetate

0.1 g. of metallic magnesium, and 1 gram of butyl iodide are reacted with metallic tin powder at 30° C. (while heat is removed continuously from the reaction zone) for two hours, bis(2-carboxyethyl)tin dibromide dimethyl ester

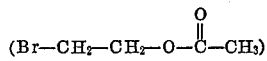

is obtained in 50 percent yield.

Example IV 75 grams of 3-bromopropionic acid (BrCH$_2$CH$_2$—COOH)

were reacted with 20 grams of metallic tin powder in the presence of 0.5 g. of iodine, 0.2 g. of magnesium and 10 cm.$^3$ of tetrahydrofuran. The reaction was conducted at 160° C. for about three hours with continuous agitation. Bis(2-carboxyethyl)tin dibromide (Br$_2$Sn(CH$_2$CH$_2$COOH)$_2$)

was recovered in 60 percent yield.

Example V

Into a reaction vessel was charged 70 grams of 3-chloropropanol (ClCH$_2$CH$_2$CH$_2$OH), 0.5 g. of iodine, 0.2 g. of magnesium, 20 grams of metallic tin powder. The reaction was conducted at 70° C. A 50 percent yield of bis-(3-hydroxypropyl)tin dichloride (Cl$_2$Sn(CH$_2$—CH$_2$—CH$_2$—OH)$_2$)

was obtained in 50 percent yield.

Example VI 60 grams of bromoacetonitrile (BrCH$_2$CN) were charged to a reaction vessel together with 0.1 gram of metallic magnesium, 1 gram of butyl iodide, 10 cc. of tetrahydrofuran and 20 grams of metallic tin powder. The reaction was conducted at 150° C. for about three hours. Bis(cyanomethyl)tin dibromide (Br$_2$Sn(CH$_2$CN)$_2$) was obtained in 60 percent yield.

| Example No. | Halogen Reactant | Reaction Conditions Temp. (°C) | Reaction Conditions Time (min.) | Catalyst Additives—Component (Quantity) | Reaction Product | Percent Yield of Product |
|---|---|---|---|---|---|---|
| VII | ICH$_2$–C(=O)–CH$_3$ | 140 | 180 | Butyl-Iodide (2 g.), tetrahydrofuran (10 cc.), Magnesium (0.1 g.). | I$_2$Sn(CH$_2$–C(=O)–CH$_3$)$_2$ | 50 |
| VIII | Cl–CH$_2$–C(=O)–CH$_3$ | 160 | 180 | do | Cl$_2$Sn(CH$_2$–C(=O)–CH$_3$)$_2$ | 40 |
| IX | BrCH$_2$CH$_2$–C$_6$H$_4$–OCH$_3$ | 140 | 180 | Iodine (0.5 g.), butanol (10 cc.), magnesium (0.1 g.). | Br$_2$Sn(CH$_2$CH$_2$–C$_6$H$_4$–OCH$_3$)$_2$ | 50 |
| X | BrCH$_2$CH$_2$CH=O | 120 | 120 | Butyl-Iodide (1 g.), tetrahydrofuran (5 cc.), magnesium (0.1 g.). | Br$_2$Sn(CH$_2$CH$_2$CH=O)$_2$ | 52 |
| XI | CH$_2$–COOCH$_3$ / BrCH–COOCH$_3$ | 140 | 180 | do | Br$_2$Sn(–CH–COOCH$_3$ / CH$_2$–COOCH$_3$)$_2$ | 70 |
| XII | COOCH$_3$ / BrCH / COOCH$_3$ | 160 | 180 | Iodine (1 g.), tetrahydrofuran (5 cc.), magnesium (0.1 g.). | Br$_2$Sn(–CH(COOCH$_3$)$_2$)$_2$ | 60 |
| XIII | Br–CH$_2$–CH–CH$_2$ / CH$_2$ / O | 140 | 180 | Butyl-Iodide (1 g.), tetrahydrofuran (5 cc.), magnesium (0.1 g.). | Br$_2$Sn(–CH$_2$–CH–CH$_2$ / CH$_2$–O)$_2$ | 50 |
| XIV | BrCH$_2$CH$_2$OCH$_3$ | 150 | 180 | Butyl-Iodide (1 g.), butanol (5 cc.), magnesium (0.1 g.). | Br$_2$Sn(CH$_2$CH$_2$OCH$_3$)$_2$ | 80 |
| XV | CH$_3$ / Br–C–CH$_2$COOH / CH$_3$ | 160 | 180 | do | Br$_2$Sn(–C(CH$_3$)$_2$–CH$_2$COOH)$_2$ | 70 |
| XVI | Br–CH$_2$–C$_6$H$_4$–C$_6$H$_4$–CONH$_2$ | 160 | 180 | do | Br$_2$Sn(CH$_2$–C$_6$H$_4$–C$_6$H$_4$–CONH$_2$)$_2$ | 80 |
| XVII | BrCH$_2$CH$_2$NO$_2$ | 150 | 180 | Butylbromide (1 g.), magnesium (0.2 g.), benzene (20 cc.), butanol (5 cc.). | Br$_2$Sn(CH$_2$CH$_2$NO$_2$)$_2$ | 85 |
| XVIII | BrCH$_2$CH–CH$_2$ / O | 80 | 180 | do | Br$_2$Sn(CH$_2$–CH–CH$_2$ / O)$_2$ | 50 |
| XIX | BrCH$_2$CH$_2$CONH$_2$ | 160 | 180 | Butylbromide (1 g.), magnesium (0.2 g.), butanol (10 cc.). | Br$_2$Sn(CH$_2$CH$_2$CONH$_2$)$_2$ | 60 |
| XX | (CH$_2$)$_7$CH$_3$ / Br–CH / (CH$_2$)$_8$COOCH$_3$ | 160 | 180 | do | Br$_2$Sn(–CH((CH$_2$)$_7$CH$_3$)((CH$_2$)$_8$COOCH$_3$))$_2$ | 40 |
| XXI | ClCH$_2$–C$_6$H$_4$–NO$_2$ | 110 | 180 | Butyl-Iodide (0.1 g.), magnesium (0.1 g.), butanol 5 cc.). | Cl$_2$Sn(CH$_2$–C$_6$H$_4$–NO$_2$)$_2$ | 50 |
| XXII | Br(CH$_2$)$_5$COOCH$_3$ | 160 | 180 | do | Br$_2$Sn(–(CH$_2$)$_5$COOCH$_3$)$_2$ | 50 |

| Example No. | Halogen Reactant | Reaction Conditions Temp. (°C.) | Time (min.) | Catalyst Additives—Component (Quantity) | Reaction Product | Percent Yield of Product |
|---|---|---|---|---|---|---|
| XXIII | I(CH₂)₅COOCH₃ | 160 | 180 | ......do...... | I₂Sn(—(CH₂)₅COOCH₃)₂ | 70 |
| XXIV | BrCH₂CH₂OH | 50 | 120 | Magnesium (0.1 g.), butyl-iodide (0.5 g.), benzene (20 cc.). | Br₂Sn(—CH₂CH₂OH)₂ | 60 |
| XXV | ClCH₂CH₂OH | 80 | 120 | ......do...... | Cl₂Sn(—CH₂CH₂OH)₂ | 70 |
| XXVI | Br(CH₂)₃—CO—C₆H₅ | 160 | 180 | Iodine (1 g.), butyl-iodide (0.5 g.), butanol (10 cc.), magnesium (0.1 g.). | Br₂Sn((CH₂)₃—CO—C₆H₅)₂ | 50 |
| XXVII | BrCH₂—(2-pyridyl) | 160 | 180 | Butylbromide (1 g.), butanol (5 cc.), magnesium (0.1 g.). | Br₂Sn(—CH₂-(2-pyridyl))₂ | 55 |
| XXVIII | BrCH₂—(6-methyl-2-pyridyl) | 160 | 180 | ......do...... | Br₂Sn(—CH₂-(6-methyl-2-pyridyl))₂ | 40 |
| XXIX | BrCH₂—(2,6-dimethylphenyl) | 150 | 180 | ......do...... | Br₂Sn(—CH₂-(2,6-dimethylphenyl))₂ | 40 |
| XXX | Br—CH₂-(dioxolanyl) | 150 | 180 | ......do...... | Br₂Sn(—CH₂-(dioxolanyl))₂ | 60 |
| XXXI | Br—CH₂—CH—CH—CH₂OH, OH | 100 | 180 | Butyl-iodide (1 g.), magnesium (0.1 g.), butanol (1 cc.), toluene (20 cc.). | Br₂Sn(—CH₂—CH—CH—CH₂OH)₂, OH | 80 |
| XXXII | Br—CH₂—CH₂—C≡CH | 120 | 120 | Butyl-iodide (1 g.), magnesium (0.1 g.), butanol (10 cc.). | Br₂Sn(—CH₂—CH₂—C≡CH)₂ | 60 |
| XXXIII | Br—CH₂—(—C₆H₄—)—CH=CH₂ | 160 | 180 | Butyl-iodide (1 g.), magnesium (0.1 g.), butanol (5 cc.). | Br₂Sn(—CH₂—(—C₆H₄—)—CH=CH₂)₂ | 40 |
| XXXIV | Br—CH₂—CH=CH—CH₂OH | 120 | 180 | ......do...... | Br₂Sn(—CH₂—CH=CH—CH₂OH)₂ | 60 |
| XXXV | Br—CH₂—C≡C—CH₂OH | 120 | 180 | ......do...... | Br₂Sn(—CH₂—C≡C—CH₂OH)₂ | 50 |
| XXXVI | Br—(CH₂)₆CN | 160 | 180 | ......do...... | Br₂Sn(—(CH₂)₆CN)₂ | 60 |
| XXXVII | Cl—(CH₂)₆CN | 160 | 180 | ......do...... | Cl₂Sn(—(CH₂)₆CN)₂ | 40 |
| XXXVIII | I—CH₂CH₂N(CH₃)₂ | | | | I₂Sn(—CH₂CH₂N(CH₃)₂)₂ | 30 |

It is to be understood that the invention is not limited by the specific examples and embodiments described hereinabove, but includes such changes and modifications as may be apparent to one skilled in the art upon reading the appended claims.

We claim:

1. A process for the production of organotin compounds comprising reacting a halogenated organic compound with metallic tin in the presence of a catalyst under superatomospheric pressure of from about 1 atmosphere to about 100 atmospheres at a temperature within the range of from about 0° C. to about 180° C., said halogenated organic compound being depicted by the formula

wherein: X is a halogen, R and R' are radicals selected from the group consisting of hydrogen and hydrocarbon radicals containing from 1 to 20 carbons which may be substituted with an alkoxy carbonyl radical containing from 2 to 10 carbon atoms, and Y is a functional radical selected from the group consisting of (a) alkenyl and alkynyl radicals each containing from 2 to 20 carbon atoms which radicals individually may be substituted with alkoxycarbonyl, nitrilo, alkanoate, carboxy, hydroxy, carbonyl, alkoxyaryl, formyl, alkoxy, nitro, epoxy, arylketo, alkylamino, aryl and amino radicals, (b) aryl radicals each containing from 6 to 24 carbon atoms which radicals may be substituted with alkyl, alkenyl, alkynyl and carbamoyl radicals, (c) pyridyl radicals containing from 5 to 25 carbon atoms which radicals may be substituted with alkyl, alkenyl and alkynyl radicals, (d) nitrilo radicals, (e) oxacycloalkyl radicals containing from 2 to 10 carbon atoms, and (f) alkoxycarbonyl radicals containing from 2 to 20 carbon atoms, and said catalyst includes metallic magnesium and at least one material selected from the group consisting of iodine and alkyl halides containing from 1 to 20 carbon atoms.

2. The process of claim 1 conducted at a temperature within the range of from about 80° C. to about 180° C.

3. The process of claim 1 conducted under an inert gas.

4. The process of claim 1 wherein the catalyst is composed at least in part of iodine.

5. The process of claim 1 wherein the catalyst is composed at least in part of an alkyl halide containing from 1 to 20 carbon atoms.

6. The process of claim 1 wherein the catalyst is composed at least in part of an alkyl iodide containing from 1 to 20 carbon atoms.

7. A process for the production of a compound having the formula

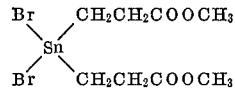

comprising reacting together $BrCH_2CH_2COOCH_3$ and metallic tin in the presence of a catalyst and butyl alcohol under superatmospheric pressure of from about 1 atmosphere to about 100 atmospheres at a temperature within the range of from about 80° C. to about 180° C., said catalyst being composed of metallic magnesium and butyl iodide.

References Cited

UNITED STATES PATENTS 3,085,102    4/1963    Yatagai et al. _____ 260—429.7

TOBIAS E. LEVOW, *Primary Examiner.*

W. F. W. BELLAMY, *Assistant Examiner.*

U.S. Cl. X.R.

260—45.75; 424—288